US006837272B2

(12) United States Patent
Ott

(10) Patent No.: US 6,837,272 B2
(45) Date of Patent: Jan. 4, 2005

(54) PIGGABLE VALVE ESPECIALLY FOR A PIGGABLE PAINT SUPPLY LINE

(75) Inventor: Winfried Ott, Rodgau (DE)

(73) Assignee: LacTec GmbH, Rodgau (DE)

( * ) Notice: Subject to any disclaimer, the term of this patent is extended or adjusted under 35 U.S.C. 154(b) by 99 days.

(21) Appl. No.: 10/397,006

(22) Filed: Mar. 25, 2003

(65) Prior Publication Data

US 2003/0188791 A1 Oct. 9, 2003

(30) Foreign Application Priority Data

Apr. 3, 2002 (DE) ........................................ 102 14 759

(51) Int. Cl.[7] ................................................ F16K 11/04

(52) U.S. Cl. ........................................ 137/874; 251/340

(58) Field of Search ................................ 137/874, 881, 137/885; 251/340

(56) References Cited

U.S. PATENT DOCUMENTS 4,660,592 A * 4/1987 Williams .................... 137/330
5,014,716 A * 5/1991 Ogawa ....................... 128/685

* cited by examiner

*Primary Examiner*—John Fox
(74) *Attorney, Agent, or Firm*—W. F. Fasse; W. G. Fasse

(57) ABSTRACT

A valve for a branching and/or connecting location of a piggable line for coating material such as paint includes a valve housing for a first throughgoing line, to which at least one second line is selectively connectable, as well as a valve closure body that is spring loaded by a valve spring and that is movable against the force of the valve spring. The valve housing and the valve closure body respectively have flushly aligned bores that have the same contour and the same diameter as each other, and that are directly adjoining each other in the closed position. This diameter is equal to the clear inner diameter of the piggable line. For opening and closing the second line, the valve closure body is movable in the valve housing in the axial direction of the bore thereof.

12 Claims, 3 Drawing Sheets

1
2
3
4
5
6
7
8
9
10
11
12
13
14
15
16
17
18
19
20
21
22
23
24
25
26
III
III

PIGGABLE VALVE ESPECIALLY FOR A PIGGABLE PAINT SUPPLY LINE

PRIORITY CLAIM

This application is based on and claims the priority under 35 U.S.C. §119 of German Patent Application 102 14 759.0, filed on Apr. 3, 2002, the entire disclosure of which is incorporated herein by reference.

FIELD OF THE INVENTION

The invention relates to a valve for a piggable line, and especially a line provided for conveying a coating material such as paint in a paint application system, whereby the valve forms a controlled branching and/or connecting location of the piggable line.

BACKGROUND INFORMATION

Valves of the above mentioned general type are typically used in automatically operating paint application systems. Such valves comprise a valve housing with generally one valve chamber therein, and a valve closure body that is spring loaded and movable against the force of the spring. Such valves serve to selectively connect at least a second line to the throughgoing line that runs through the valve housing. It is further known to use so-called pigs movably arranged in the paint lines to minimize the paint filling losses arising from the length of the paint lines. Namely, such pigs are used for the supply of special paint colors to the paint spray booths for example in connection with the painting of motor vehicle bodies, as well as for the recovery of paint residues or remaining amounts of paint out of the paint supply lines between the automatically operating color changers and the respective associated paint spray atomizers.

In the general context of this technology, pigs are often utilized, which are to be reused repeatedly many times, or particularly that are to repeatedly move back and forth in closed lines or line segments during a lengthy operating lifetime, in order to separate the respective paint quantities contained in the lines from the respective paint pushing medium.

For these reasons, it is efficacious to embody both the pigs as well as the lines in which the pigs move back and forth, in such a manner so as to increase the operating life of the pigs to as great an extent as possible. A frequent replacement or exchange of the pigs, as well as a complex monitoring of the pigs, are to be avoided.

SUMMARY OF THE INVENTION

In view of the above, it is an object of the invention to provide measures in the area of such a valve, which make it possible to achieve a considerably greater operating lifetime of the pigs being used, than was previously possible. It is a further object of the invention to avoid locations and areas in the valves, at which paint residues or the like can form, which residues are not reached by the pigs. The invention further aims to avoid or overcome the disadvantages of the prior art, and to achieve additional advantages, as apparent from the present specification.

The above objects have been achieved according to the invention in a valve for a branching and/or connecting location of a piggable line for coating material and especially for paint, comprising a valve housing for a first throughgoing line, to which at least one second line is selectably connectable, as well as a spring loaded valve closure body that is movable against the force of the biasing valve spring. Particularly according to the invention, the valve housing and the valve closure body respectively are each provided with bores that are flushly aligned with each other, have the same contour and the same diameter as each other, and are directly adjoining one another in the closed position. Furthermore, the diameter of the bores of the valve housing and of the valve closure body is equal to the clear inner diameter of the piggable line. Also, in order to selectively open and close the second line, the valve closure body is movable the valve housing in the axial direction of the bore of the valve housing.

In the area of the bore, as well as in the closed condition, when a pig can run through the valve, the valve has absolutely no protruding or projecting edges and also absolutely no undercut or back tapering areas, which would damage the lips of the pig, or which would allow the accumulation therein of paint residues that are not reachable by the pig. For this reason, the above mentioned inventive features serve to considerably increase the operating service life of the utilized pigs, and similarly to considerably reduce the paint remainders or residues that previously became deposited in recesses or the like in the area of branching locations and could not be reached by the pig.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF A PREFERRED EXAMPLE EMBODIMENT AND OF THE BEST MODE OF THE INVENTION

Figure 1:
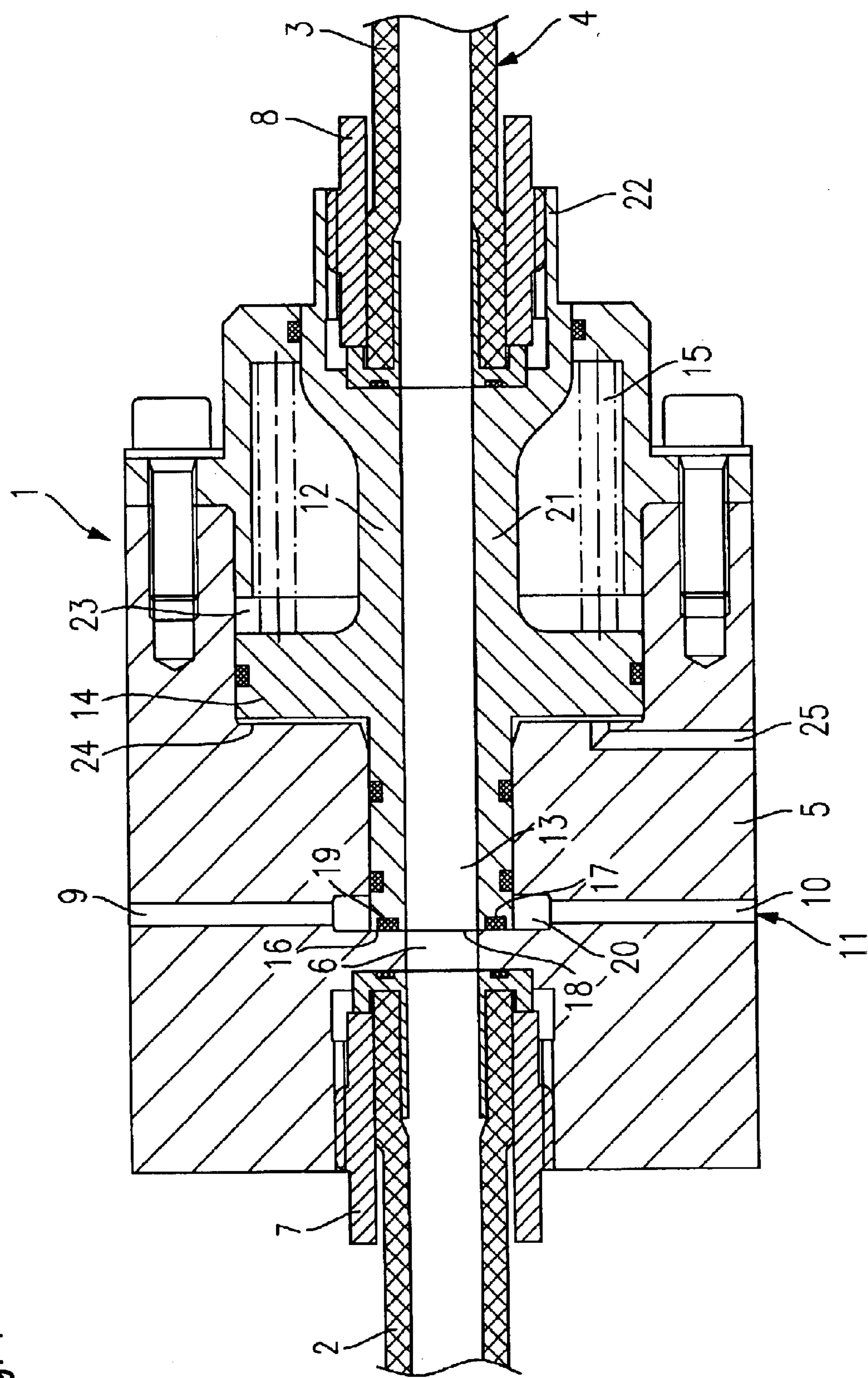
FIG. 1 is a sectional view through a valve according to the invention in the closed condition.

According to the example embodiment shown in FIG. 1, a valve 1 is arranged between two line segments 2 and 3 of a throughgoing piggable line 4, and comprises a valve housing 5 with a bore 6, of which the diameter is equal to the clear inner diameter of the line 4. The two line segments 2 and 3 are connected to the valve housing 5 by means of any typical line connecting elements 7 and 8.

Further according to the illustrated example embodiment, the valve housing 5 comprises two further bores 9 and 10 that branch off or respectively extend perpendicularly to the bore 6. These further bores 9 and 10 can respectively be a part of a second line 11 or further lines, which are selectively connectable to the line 4 by means of the valve 1.

For opening and closing the valve 1, a valve closure body 12 is provided. It similarly has a bore 13 for the flow medium to flow therethrough. The bore 6 for the flow medium in the valve housing 5, and the bore 13 in the valve closure body 12, are arranged flushly aligned with one another, as well as having the same contour and respectively the same diameter as one another, and being directly adjoining one another in the closed position. In this context, the diameter of the bores 6 and 13 is equal to the clear inner diameter of the piggable line 4. Therefore, in closed position of the valve 1, it is possible that a pig (not shown in the drawings) can move through the entire line 4 and through the valve 1, without having to pass by edges, projections or protrusions, and undercut or backtapered locations and areas.

Figure 2:
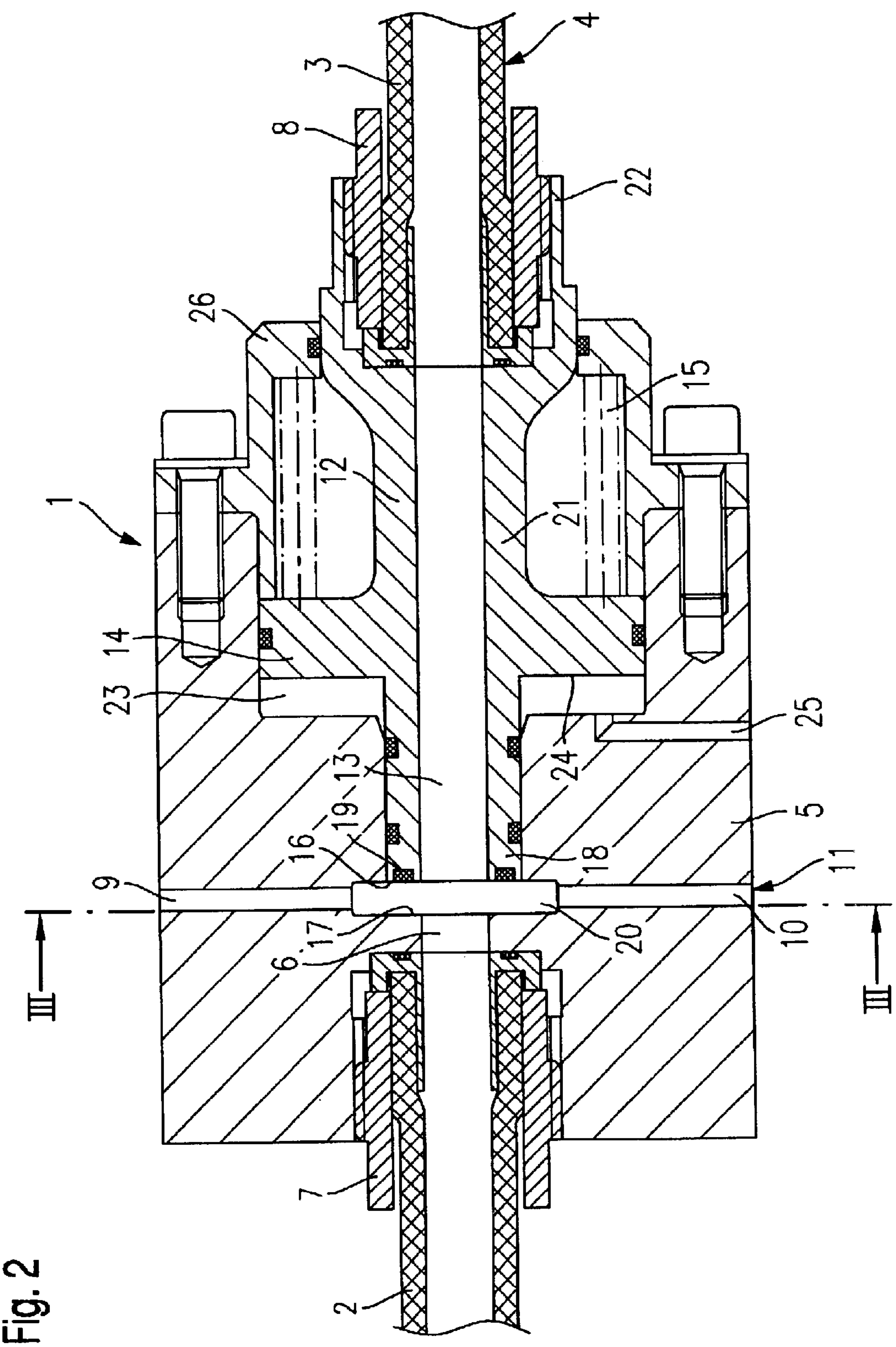
FIG. 2 is a sectional view like FIG. 1, but showing the valve closure body in the open condition.

For opening the valve 1 and for establishing a connection between the throughgoing line 4 and the line 11 that extends perpendicularly thereto according to FIG. 1, the valve closure body 12 is arranged to be movable in the axial direction in the valve housing 5. A spring 15 exerts a biasing force on the valve closure body in the area of a flange 14 to urge a seal surface 16 of the valve closure body 12 against a valve seat surface 17. However, the valve closure body 12 is liftable or movable against the force of the biasing spring 15 acting on the area of the flange 14, so as to lift the seal surface 16 away from the valve seat surface 17. This can be seen by comparing the two FIGS. 1 and 2.

The seal surface 16 is an annular ring surface arranged on the end face at the free end 18 of the valve closure body 12. Suitably, this seal surface 16 is formed by a seal ring 19.

Figure 3:
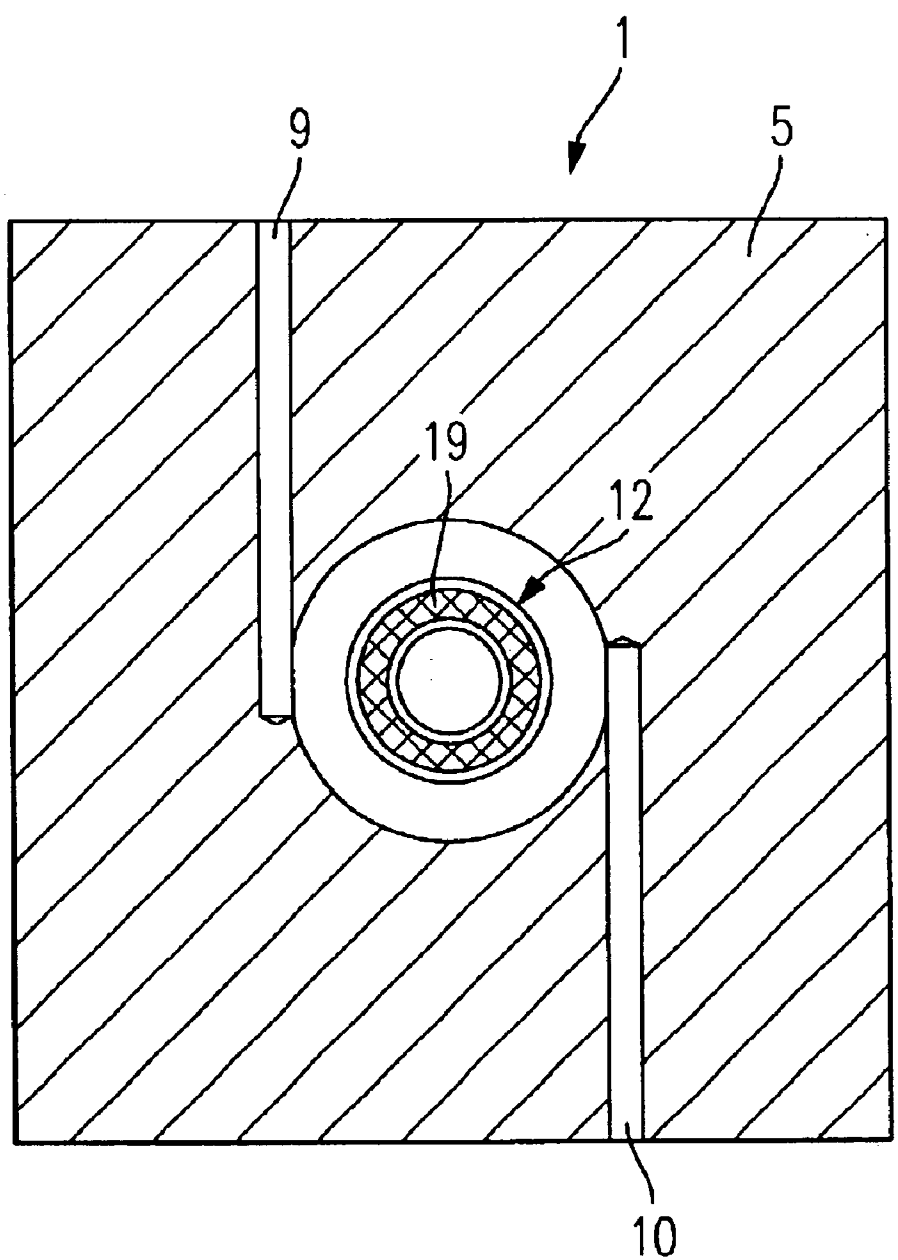
FIG. 3 is a sectional view along the line III—III of FIG. 2.

A valve chamber 20 is at least partially provided outwardly in the area of the free end of the valve closure body 12. Suitably, this valve chamber 20 is annular or ring shaped and surrounds the free end 18 of the valve closure body 12 in a coaxial manner. The two bores 9 and 10 of the line 11 communicate into the valve chamber 20, as shown in FIGS. 1 and 3.

As soon as the valve closure body 12 moves in the axial direction in this manner, so that its ring shaped seal surface 16 is lifted away from the ring shaped valve seat surface 17 (see FIG. 2), a flow conducting connection is established from the bore 6 in the valve housing 5 and the bore 13 in the valve closure body 12 to the valve chamber 20, and vice versa, so that a flow medium can flow out of the line 4 and simultaneously into the line 11 or into the branching bores 9 and 10, or the opposite direction.

In the closed position of the valve, the valve chamber 20 is an annular or ring shaped chamber. The valve 1 is therefore correspondingly called an annular or ring gap valve.

The valve closure body 12 essentially consists of a hollow valve shaft 21, to the second end 22 of which the line segment 3 of the line 4 can be connected. The flange 14 is arranged at a spacing distance from both ends 18 and 22, whereby the flange 14 on the one hand is acted on by the force of the valve spring 15, and on the other hand operates as a piston of a pneumatically operating actuating drive. It is arranged in a cylindrical chamber 23 in the valve housing 5, and is slidable against the force of the valve spring 15, for which an annular or ring shaped piston surface 24 on the flange 14 is acted on by a pressure medium from a line 25.

The second end of the valve spring 15 is braced against a cover or lid 26, which also covers or closes the cylindrical chamber 23. According to this particular example embodiment, the cover or lid 26 also serves for guiding the valve shaft 21.

The valve 1 can find applications at branching and/or connecting locations of lines, whereby at least the one line 4 is simultaneously piggable. Suitably, one line segment 3 of the throughgoing line 4 is directly connectable to the axially movable valve shaft 21 with a bore having the same contour.

The flange 14 serving as an actuator piston is connected in a one-piece integral manner with the hollow valve shaft 21. The valve shaft 21 and the flange 14 form a single integral unit.

The valve seat surface 17 bounds the bore 6 in the valve housing 5, so that the valve seat surface 17 also comprises a bore, which is piggable or functional with a pig, or which especially comprises the same diameter as the diameter of the line 4. The bore 6 and also the valve closure body 12 or the valve shaft 21 with the bore 13 are arranged centrally in the valve housing 5, as shown in the drawings.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A valve for a branching and/or connecting location of a piggable line for a coating material comprising:

a valve housing for a first throughgoing piggable line to which at least one second line is selectively connectable, a valve spring, and a valve closure body that is biased by the valve spring and is movable against the force of the valve spring, wherein the valve housing and the valve closure body respectively comprise bores that are respectively aligned flushly with each other, have the same contour and the same diameter as each other, and are directly adjoining each other in a closed position, wherein the diameter of the bores is equal to a clear inner diameter of the piggable line, and wherein the valve closure body is movable in the valve housing in an axial direction of the bore of the valve housing for opening and closing the second line.

2. The valve according to claim 1, wherein the valve closure body comprises a hollow valve shaft having a first free end with a ring shaped end face forming a seal surface thereon, wherein the valve housing includes a ring shaped valve seat surface, and wherein the seal surface is selectively seatable on and liftable away from the valve seat surface.

3. The valve according to claim 2, wherein the valve housing encloses a valve chamber at least partially outwardly around and in the area of the first free end of the valve shaft, and the valve chamber is connected with at least one line of the at least one second line.

4. The valve according to claim 3, wherein the valve chamber is an annular ring chamber.

5. The valve according to claim 2, wherein the valve housing encloses a cylindrical chamber surrounding the valve shaft, and the valve shaft comprises a flange that serves as a piston that can be acted on by a pressure medium, whereby the flange is movable in the cylindrical chamber surrounding the valve shaft.

6. The valve according to claim 5, wherein the valve spring is braced against the flange.

7. The valve according to claim 5, further comprising a lid that is removably secured to the valve housing to removably cover the cylindrical chamber.

8. The valve according to claim 7, wherein the valve shaft is guided in the lid.

9. The valve according to claim 5, wherein the flange serving as the piston, together with the valve shaft, form a single integral unit.

10. The valve according to claim 2, wherein the throughgoing line includes at least one line segment that is directly connected to the axially movable valve shaft.

11. The valve according to claim 2, wherein the valve seat surface is allocated to the bore of the valve housing which is piggable.

12. The valve according to claim 1, wherein the bore and the valve closure body comprising the hollow valve shaft are centrally arranged in the valve housing.

* * * * *